US008437699B2

(12) United States Patent
Pollock et al.

(10) Patent No.: US 8,437,699 B2
(45) Date of Patent: May 7, 2013

(54) SCHEDULED SYNCHRONOUS DATA TRANSMISSION FOR SCHEDULED MOBILE PLATFORMS

(75) Inventors: Bruce K. Pollock, Seattle, WA (US); David L. Allen, Kent, WA (US)

(73) Assignee: The Boeing Company, Chicago, IL (US)

( * ) Notice: Subject to any disclaimer, the term of this patent is extended or adjusted under 35 U.S.C. 154(b) by 1586 days.

(21) Appl. No.: 11/934,501

(22) Filed: Nov. 2, 2007

(65) Prior Publication Data

US 2010/0041342 A1 Feb. 18, 2010

(51) Int. Cl.
*H04B 7/00* (2006.01)

(52) U.S. Cl.
USPC ............... 455/66.1; 455/68; 701/14; 340/3.5; 340/945; 370/310; 370/465; 709/246; 709/230; 375/219

(58) Field of Classification Search ............ 455/66, 455/67.1, 431, 463; 701/14, 29, 35; 340/3.5, 340/945, 825.15, 825.72; 370/310, 465; 709/246, 230; 375/200, 219
See application file for complete search history.

(56) References Cited

U.S. PATENT DOCUMENTS

| | | | | |
|---|---|---|---|---|
| 6,173,159 | B1 * | 1/2001 | Wright et al. | 455/66.1 |
| 6,643,510 | B2 * | 11/2003 | Taylor | 455/431 |
| 6,760,778 | B1 * | 7/2004 | Nelson et al. | 709/246 |
| 7,519,014 | B2 * | 4/2009 | Allen et al. | 370/310 |

OTHER PUBLICATIONS

Allen, David L. "EFB Electronic Flight Bag," AERO, Jul. 2003 Third Quarter, pp. 16-27.

* cited by examiner

*Primary Examiner* — April G Gonzales
(74) *Attorney, Agent, or Firm* — Harness, Dickey & Pierce, P.L.C.

(57) ABSTRACT

A system for automatically synchronizing and communicating data between a mobile platform and a remote system, where the remote system has a backoffice repository and a scheduler application controlled by an entity operating said platform, includes: a backoffice interface manager for interfacing with said repository and said application, to communicate scheduling information between said platform and said application; and a computer controlled support system located remote from said platform and in communication with said backoffice interface manager, and further including a common data store system for holding said data and synchronizing the communication of said data between at least one mobile subsystem on said application, to ensure communication of said data between said mobile subsystem and said remote system within a predetermined time of executing an operational procedure with said platform.

20 Claims, 3 Drawing Sheets

SCHEDULED SYNCHRONOUS DATA TRANSMISSION FOR SCHEDULED MOBILE PLATFORMS

BACKGROUND

The present disclosure relates to systems and methods for transmitting data to mobile platforms including aircraft, and more particularly to a system and method that automates and synchronizes the supply of operational data to a mobile platform from an entity operating the mobile platform, and vice versa, such that operation of the mobile platform in accordance with a predetermined schedule can be ensured.

The statements in this section merely provide background information related to the present disclosure and may not constitute prior art.

In the operation of aircraft, and commercially commercial passenger aircraft and cargo aircraft, it is required that certain data be made available and loaded into various subsystems of the aircraft prior to dispatch of the aircraft. Currently, this is typically done via paper documents which must be delivered to the aircraft by an individual prior to dispatch. As will be appreciated, the manual delivery of paper documents requires coordination between multiple airline backoffice systems that are used to generate the needed data, and consideration of airline dispatch procedures, to ensure the delivery of the data sufficiently prior to the scheduled dispatch (i.e., departure) time of the aircraft. This can give rise to delays in dispatching the aircraft when the timing of the availability of the data, or its physical delivery to the flight crew of the aircraft, does not meet the dispatch requirement of the aircraft. Examples of different types of information/data that need to be provided to the pilot and/or co-pilot prior to departure of the aircraft are the Flight Folder for the flight crew, passenger information for the flight crew.

In most cases, this data must be provided to the aircraft and during the mission, the flight and cabin crew enter other data which must be transmitted back to the airline. Currently this is done via paperwork. The problem is that during disruptions, the data must be hand delivered to the aircraft which may incur delays. Because the data is in paper form, the crew reports must be in paper form as well, which requires later data entry to allow other backoffice systems to record and disseminate the data.

SUMMARY

The present disclosure is directed to a system and method for automating and synchronizing the communication of data and scheduling information to a mobile platform. In one exemplary embodiment, a system for automatically synchronizing and communicating data between a mobile platform and a remote system, where the remote system has a backoffice data repository and a scheduler application controlled by an entity operating said mobile platform, the system includes a backoffice interface manager for interfacing with said data repository and said scheduler application, to communicate data between said mobile platform and said data repository, and to communicate scheduling information between said mobile platform and said scheduler application; and a computer controlled support system located remote from said mobile platform and in communication with said backoffice interface manager, and further including a common data store "CDS" ground component system for holding said data and synchronizing the communication of said data between at least one mobile subsystem carried on said mobile platform, in accordance with scheduling instructions received from said scheduler application, to ensure communication of said data between said mobile subsystem and said remote system within a predetermined time of executing an operational procedure with said mobile platform.

In another embodiment a system is disclosed for automatically providing and synchronizing data to a mobile platform, prior to dispatch of the mobile platform, from a remotely located dispatch system having a data repository and a scheduler application. The system includes a backoffice interface manager for interfacing with the data repository and the scheduler application, to receive data from the data repository and scheduling information from the scheduler application; and a computer controlled support system located remote from the mobile platform and in communication with the backoffice interface manager, and further including a common data store (CDS) ground component subsystem for holding the data and synchronizing the supply of the data to at least one mobile subsystem carried on the mobile platform, in accordance with scheduling instructions received from the scheduler application, to ensure delivery of the data to the mobile subsystem on the mobile platform within a predetermined time prior to dispatch of the mobile platform. The computer controlled support system includes an electronic communications management file "eCMF" for coordinating and transmitting multi-network communications between the mobile subsystem of the mobile platform and the dispatch system being operated by the entity. The computer controlled support system also includes a workflow manager/event scheduler, a ground based common data store system, and a data synchronizer. The workflow manager/event scheduler is operated by the entity, and is adapted to determine when to transmit scheduling information to the mobile platform. The ground based common data store system is for storing the data and the scheduling information. The data synchronizer interfaces with the workflow manager/event scheduler and the ground based common data store system to determine when to transmit wireless messages including data to the mobile platform. The data synchronizer is further adapted to monitor return wireless transmissions from the mobile platform and to determine when to report to a remote, ground based operator of the mobile platform that the message was not received by the mobile platform.

A method is also disclosed for automatically synchronizing and communicating data between a mobile platform and a remote system, where the remote system has a data repository and a scheduler application both controlled by an entity operating said mobile platform, the method includes using an interface manager to interface with said data repository and said scheduler application, and using a computer controlled support system located remote from said mobile platform and in communication with said interface manager, and having a common data store "CDS" subsystem, to hold data and to synchronize the communication of said data between at least one mobile subsystem carried on said mobile platform and said data repository, to facilitate communication between said at least one mobile subsystem and said scheduler application, and to ensure communication of said data between said mobile subsystem and said remote system within a predetermined operational event pertaining to said mobile platform.

While the present system and method is particularly well suited to commercial and military aircraft applications, it will be appreciated that the teachings discussed below can be applied to essentially any form of mobile platform, whether that be a marine vessel, a land vehicle such as a bus or train, or other airborne mobile platforms such as manned or unmanned aircraft or rotorcraft.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. As used herein, the term "exemplary" indicates an example of an embodiment, and not necessarily the only embodiment.

Figure 1:
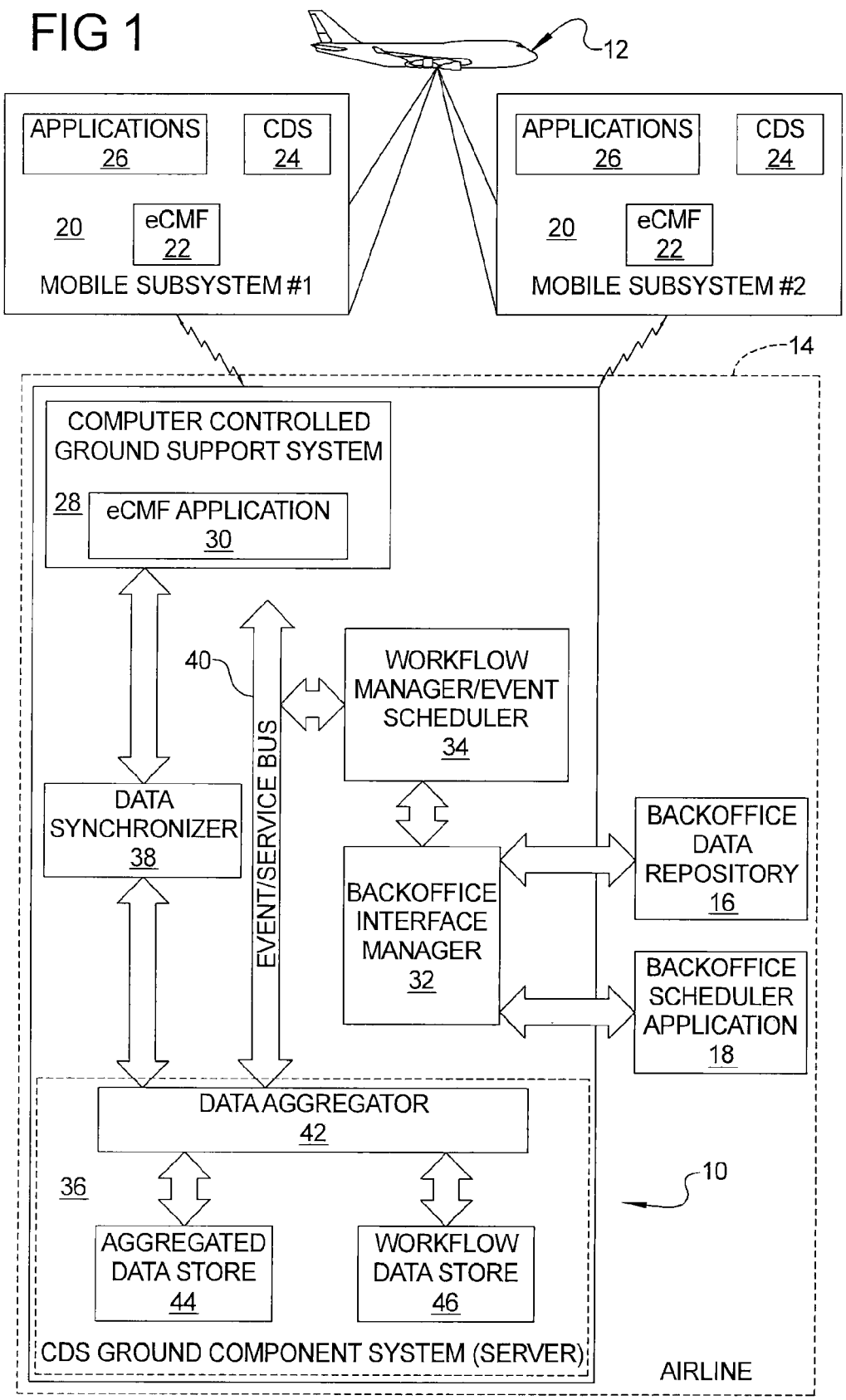
FIG. 1 is a block diagram of one exemplary implementation of a system in accordance with the present disclosure.

Referring to FIG. 1, there is shown a system 10 in accordance with one exemplary embodiment of the present disclosure. The system 10 helps to ensure that the supply of needed data and scheduling information for a mobile platform, in this example an aircraft 12, is automatically accomplished and synchronized with various systems under the control of an entity that is operating one or more of the aircraft 12. While the following discussion will be directed principally to the mobile platform being an aircraft 12 that is operated by an airline, it will be appreciated that the teachings presented herein could just as readily be applied to the automatic supply and synchronizing of information to any form of mobile platform, whether it be a marine vessel, a land vehicle such as a bus or train, or even other forms of airborne mobile platforms such as rotorcraft or manned or unmanned aircraft.

Referring further to FIG. 1, the system 10 may be operated by an airline 14 (i.e., an entity operating the aircraft 12). The airline 14 also hosts the operation of a backoffice data repository 16 and a backoffice scheduler application 18. The backoffice data repository 16 may be a server or other storage device on which is stored data issuing from a plurality of different systems, such as a passenger reservation system, an aircraft maintenance system, a flight planning system, etc. Each of these systems is unique, developed separately, and does not necessarily communicate with other systems in a consistent way. Presently, these systems either yield visual screens of information, or physical outputs such as printouts, spreadsheets, etc. In general, they do not communicate with any onboard avionics such as electronic flightbags, flight management computers, etc. The backoffice scheduler application 18 also represents many subsystems at the airline 14 that includes scheduling information for flights, crew personnel, cargo, etc. These various systems are also typically unique and generally do not communicate uniformly with the other systems. Their medium of output is typically by way of video screens, paper printouts in text or spreadsheet form, etc. In general these subsystems do not communicate with any onboard avionics such as electronic flightbags, flight management computers, etc.

Each aircraft 12 may include one or more mobile subsystems 20 for communicating with the system 10. The mobile systems 20 may be either fixedly secured within the aircraft 12 or they even comprise subsystems that are moveable within the aircraft, or possibly even hand holdable subsystems that may be carried by a pilot, co-pilot or any crew member. The mobile subsystems 20 may include an electronic communications management function application 22 ("eCMF application 22") in communication with a common data store (CDS) 24 storage device. The CDS 24 may be in communication with various applications 26 relating to various subsystems of the aircraft 12, for example, the avionics subsystem of the aircraft. The applications 26 on a given aircraft 12 may access the CDS 24 of the mobile subsystem 20 carried on the aircraft to obtain needed data or scheduling information. The applications 26 may also write data to the CDS 24 that eventually may be downloaded via the system 10 and communicated to the airline 14.

The system 10 generally includes a computer controlled ground support system 28 that also includes an eCMF application 30 for coordinating multi-network communications between the mobile subsystem 20 of the aircraft 12 and the airline 14. The system 10 also includes a backoffice interface manager 32, a workflow manager/event scheduler application 34, a CDS ground component server 36, and a data synchronizer 38 interfaced to the workflow manager/event scheduler 34 via an event/service bus 40, and also to the computer controlled ground support system 28. The CDS ground component server 36 forms a subsystem having a data aggregator 42, an aggregated data store 44 and a workflow data store 46. The aggregated data store 44 may be used to store data received from the backoffice data repository 16, while the workflow data store 46 may store scheduling data or information received from the backoffice scheduler 18. The data aggregator 42 is in communication with the data synchronizer 38 and the workflow manager/event scheduler 34, as well as the aggregated data store 44 and workflow data store 46. In operation, various forms of data required by the aircraft 12 and/or various members of its flight crew (i.e., pilot and/or co-pilot) are accessed automatically from the backoffice data repository 16 by the backoffice interface manager 32. The backoffice interface manager 32 similarly automatically obtains needed or desired scheduling data or information from the backoffice scheduler 18 that will be required by the workflow manager/event scheduler 34 and/or the flight crew. The data aggregator 42 directs this information from the backoffice subsystems 16 and 18 to one of the two data stores: the workflow data store 46, which receives schedule information, and the aggregated data store 44, which receives flight-related data and like scheduling information. However, it will be appreciated that with minor modification, the data aggregator 42 could potentially be configured to interface directly to the backoffice subsystems 16 and 18. The data aggregator 42 performs the important function of associating backoffice flight-oriented data with the specific aircraft 12 that the data and scheduling information was intended for.

The workflow manager/event scheduler 34 monitors the workflow data store 46. The scheduler 34 uses schedule information from the workflow data store 46 to drive delivery of application-defined data aggregations or packages to the aircraft 12 associated with the scheduled event (such as flight takeoff) by way of the data synchronizer 38. Workflows usually require temporal offsets from the scheduled event so that data arrives prior to the event. Failure of either of the backoffice systems 16 or 18 to provide required data on time will cause the workflow manager/event scheduler 34 to generate messages to responsible personnel at the airline 14 so that backup manual procedures can be initiated. Workflow rules are configurable by the user of the system 10.

The data synchronizer 38 uses the eCMF application 30 to transmit application-defined data packages to the aircraft 12.

The data synchronizer 38 also monitors the success of the delivery of the data packages. Based on pre-defined workflow rules, the data synchronizer 38 can cause notifications to be sent to identified personnel at the airline 14. This may be accomplished by way of a notification service that is one of a plurality of application services operating on the computer controlled ground support system 28. This notification can take the form of emails, text messages, faxes, etc., if it is detected that one or more packages have not reached their destinations on time, thus enabling alternate (i.e., backup) procedures for delivery if deemed necessary.

Figure 2A:
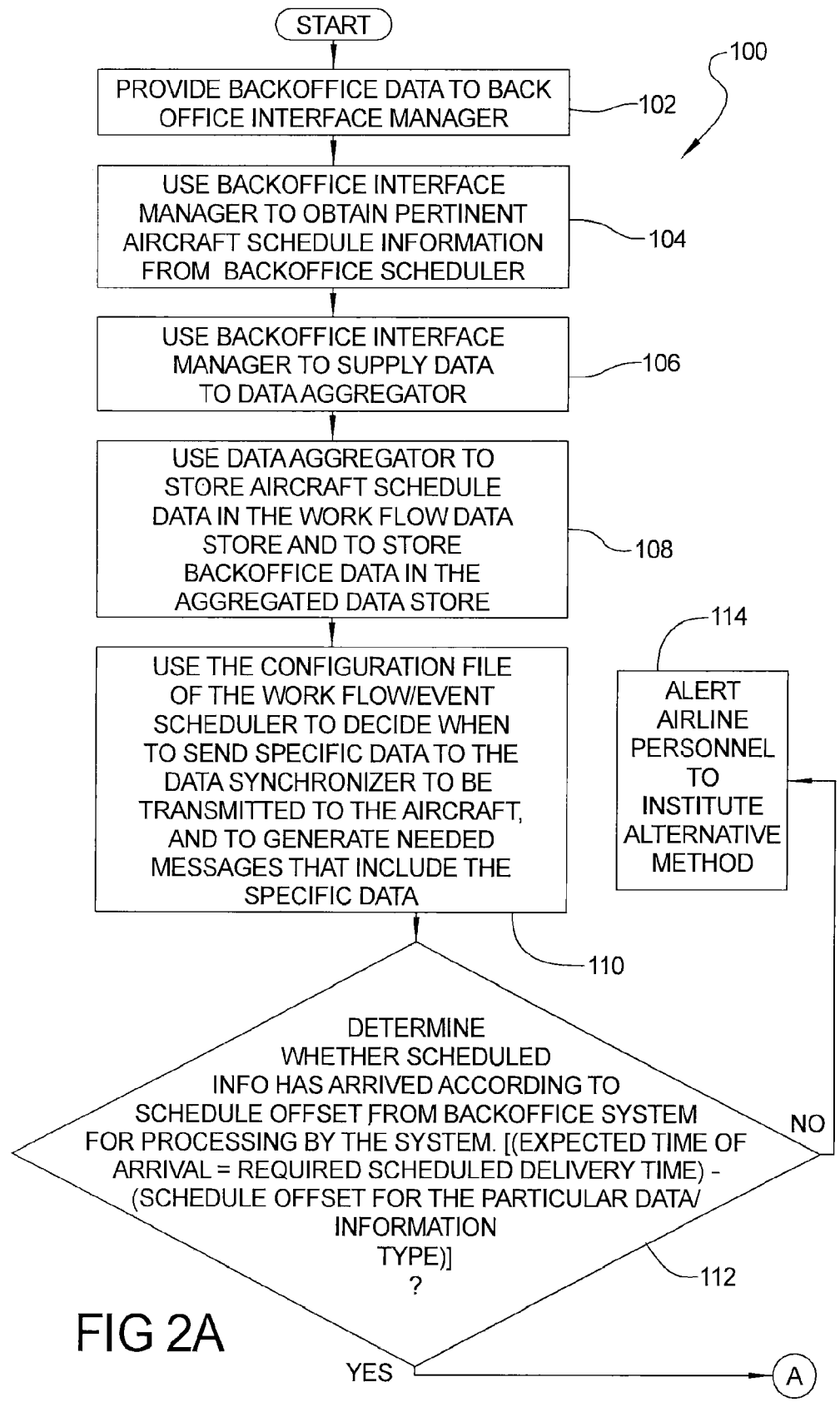
FIGS. 2A and 2B illustrate a flowchart of exemplary major operations performed by the system of FIG. 1.
Figure 2B:
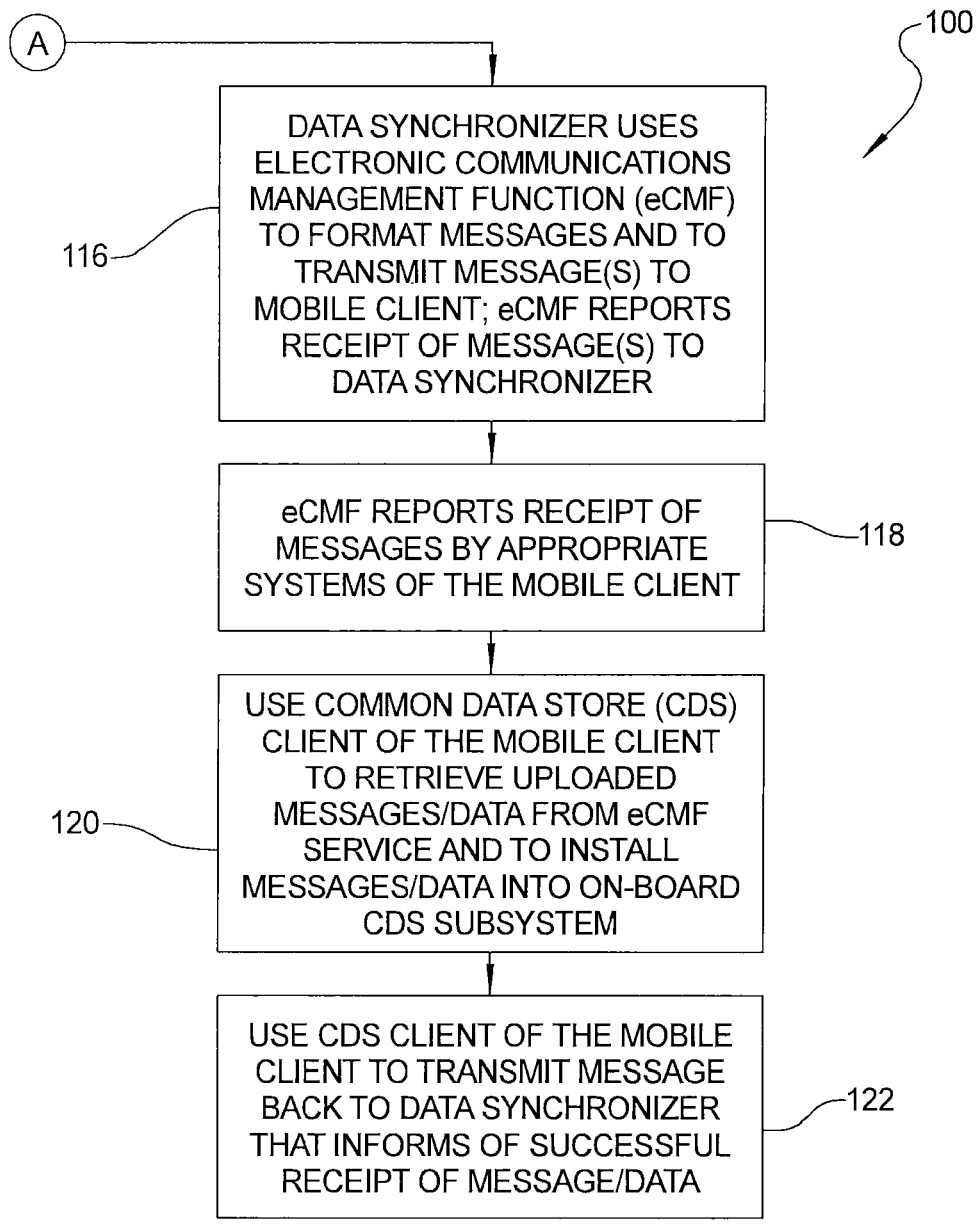

Referring to FIGS. 2A and 2B, an exemplary sequence of operation for the system 10 is illustrated in flowchart 100. At operation 102, the backoffice interface manager 32 obtains backoffice data for the aircraft 12. At operation 104 the backoffice interface manager 32 obtains pertinent aircraft scheduling information from the backoffice scheduler 18. The backoffice interface manager 32 converts the various formats of data and scheduling information that it receives into a common format usable by the components and subsystems of system 10. The backoffice interface manager 32 then provides the data and scheduling information to the data aggregator 42, as indicated at operation 106. At operation 108 the data aggregator 42 stores the scheduling information in the work flow data store 46 and the backoffice data in the aggregated data store 44. At operation 110, a configuration file of the workflow event scheduler 34 is used to decide when to send specific backoffice data to the data synchronizer 38, that will then be sent to the aircraft 12, and to generate needed messages that include the specific backoffice data.

At operation 112 it is determined whether scheduled information has arrived to the mobile subsystem 20 according to a schedule offset from the backoffice scheduler 18. This may be alternatively expressed as looking at an expected time of arrival of a message (which is set equal to a required schedule delivery time), minus a predetermined schedule offset (i.e., delivery time period). Essentially, the message will not be considered to be received within time by the mobile subsystem 20 unless it is received at or prior to the schedule offset time associated with the message. If the message is not received according to the schedule offset, then the workflow manager/event scheduler 34 determines that the need to alert airline personnel has arisen so that an alternate method of delivering the needed messages can be implemented, as indicated at operation 114.

Conversely, if the result of operation 112 it is determined that the message is received within the schedule offset, then at operation 116 the data synchronizer 36 uses the eCMF application 30 to format messages that are usable by the various subsystems of the aircraft 12 and to transmit messages to the mobile subsystem 20 of the aircraft. The eCMF application 30 also reports receipt of a message (or messages) to the data synchronizer 38. At operation 118 the eCMF application 30 reports the receipt of a message (or messages) by the intended appropriate system (or systems) of the mobile subsystem 20 of the aircraft 12. At operation 120, the CDS 24 of the mobile system 20 is used to retrieve uploaded messages/data from the eCMF 22 application and to install messages/data into the on-board CDS 24.

It will also be appreciated the schedule offset is configurable by the airline 14. In an airline application, for example, the airline 14 will make a determination about how much time is needed to activate an alternative delivery mechanism. For a particular event type and a particular kind of information, consider the example of a passenger list that must be delivered five minutes before a scheduled pushback of an aircraft from a gate at airport terminal. Furthermore, assume that airline personnel know that it would take fifteen minutes to deliver the passenger list by hand to the flight crew of the aircraft after they (i.e., airline personnel) are notified of a delivery failure of this information by the system 10. So an airline person might reasonably enter an offset of "-20" into a configuration file that controls the workflow manager/event scheduler's trigger for that particular type of data.

The workflow event scheduler 34 includes a configuration file 48 that provides instructions to the workflow event manager/scheduler on when to notify the entity operating the mobile platform that a specific message sent to the mobile platform was not received by the mobile platform. This offset will be associated with receipt of the passenger information from the back office scheduler 18 for a particular flight of the aircraft. As a further example, assume that the flight is scheduled to take off at 12:30 p.m. That schedule is known well in advance and the system 10 would have received the schedule long before specific information about the flight becomes available and stored that information in the workflow data store 46. If the scheduled departure, recorded in the workflow data store 46, is 12:30 p.m., then 20 minutes before then, at 12:10 p.m., the workflow manager/event scheduler 34 of system 10, having been configured for that 20 minute offset for passenger information, may check to see whether passenger information has been received from the back office data repository 16 for the flight. If not, an alert would be sent to the identified airline personnel to initiate the alternative procedure. Also, if the flight schedule was changed owing to seasonal changes or delayed arrival of equipment, that particular schedule information for that flight would be forwarded from the back office scheduler 18 to the system 10 by means of the back office interface manager 32. The aggregator 42 will then update this information in the workflow data store 46.

From the foregoing it will be appreciated that the system 10 enables the acquisition, formatting, and synchronized feeding of the backoffice data and/or scheduling information to specific mobile platforms as needed. The system 10 automates and synchronizes various procedures that were heretofore performed manually by individuals. The system 10 helps to ensure that needed backoffice data and scheduling information is provided to a mobile platform within a needed time frame prior to a scheduled departure of the mobile platform. Importantly, information in various diverse forms (text documents, spreadsheets, etc.) is accumulated and formatted in a manner that allows it to be packaged into messages that can be received and processed by a mobile subsystem of a mobile platform, as needed to meet the needs of the various applications and subsystems used on the mobile platform.

It will also be appreciated that while the transfer of data and scheduling instructions from the backoffice data repository 16 and the backoffice scheduler application 18, to a mobile platform, has been described, that the communication could just as readily be from the mobile platform 12, via the system 10, to the backoffice data repository 16 and backoffice scheduler application 18. Thus, the system 10 provides the significant advantage of fully bidirectional communications between the mobile platform 12 and the subsystems 16 and 18 that the airline 14 operates, as well communications capability with any other airline subsystem where notification messages from the mobile platform would need to be received.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for automatically synchronizing and communicating data between a mobile platform and a remote system, where the remote system has a backoffice data repository and a backoffice scheduler application controlled by an entity operating said mobile platform, the system comprising:
   a backoffice interface manager for interfacing with said data repository and said scheduler application, to communicate data between said mobile platform and said data repository, and to communicate scheduling information between said mobile platform and said scheduler application, the backoffice interface manager further configured to convert a plurality of formats of the data from the backoffice data repository and the scheduling information from the backoffice scheduler into a common format; and
   a computer controlled support system located remote from said mobile platform and in communication with said backoffice interface manager, and further including a common data store (CDS) ground component system for holding said data and synchronizing the communication of said data between at least one mobile subsystem carried on said mobile platform, in accordance with scheduling instructions received from said scheduler application, to ensure communication of said data between said mobile subsystem and said remote system within a predetermined time of executing an operational procedure with said mobile platform.

2. The system of claim 1, wherein said computer controlled support system comprises a computer controlled ground support system that includes an electronic communications management file "eCMF" for coordinating and transmitting multi-network communications between said mobile subsystem of said mobile platform and said remote system being operated by said entity.

3. The system of claim 1, wherein said computer based control system comprises a data synchronizer responsive to said CDS ground component system for assisting in synchronizing and transmitting said data received from said CDS subsystem to said mobile ground component system of said mobile platform.

4. The system of claim 3, wherein said computer controlled support system comprises a workflow manager/event scheduler for controlling when scheduling information is to be transmitted to said data synchronizer.

5. The system of claim 1, wherein said CDS ground component comprises:
   a data aggregator;
   an aggregated data store for storing data generated by said backoffice data repository controlled by the entity, where the backoffice data repository generates data pertaining to different functions affecting operation of said mobile platform; and
   a workflow data store for storing scheduling instructions received from said scheduler application that generates scheduling information pertaining to the operation of said mobile platform,
   wherein said data aggregator coordinates the storage of said data in said aggregated data store and said scheduling instructions in said workflow data store.

6. The system of claim 4, wherein said computer controlled support system includes an event/service bus for interfacing said workflow manager/event scheduler with said data synchronizer.

7. The system of claim 1, wherein said mobile platform includes an on-board common data store (COS) and an electronic communication management function (eCMF) application for managing the storage of said data in said on-board CDS.

8. The system of claim 4, wherein said workflow event scheduler includes a configuration the that is accessed by said data synchronizer, and that provides instructions to said data synchronizer on when to notify said entity operating said mobile platform that a specific message sent to said mobile platform was not received by said mobile platform.

9. A system for automatically providing and synchronizing data to a mobile platform, prior to dispatch of the mobile platform, from a remotely located dispatch system having a data repository and a scheduler application, the system comprising:
   a backoffice interface manager for interfacing with said data repository and said scheduler application, to receive data from said data repository and scheduling information from said scheduler application; and
   a computer controlled support system located remote from said mobile platform and in communication with said backoffice interface manager, and further including a common data store (CDS) ground component subsystem for holding said data and synchronizing the supply of said data to at least one mobile subsystem carried on said mobile platform, in accordance with scheduling instructions received from said scheduler application, to ensure delivery of said data to said mobile subsystem on said mobile platform within a predetermined time prior to dispatch of said mobile platform;
   said computer controlled support system including an electronic communications management file "eCMF" for coordinating and transmitting multi-network communications between said mobile subsystem of said mobile platform and said dispatch system being operated by said entity;
   a workflow manager/event scheduler operated by said entity, and adapted to determine when to transmit scheduling information to said mobile platform;
   a ground based common data store system for storing said data and said scheduling information;
   a data synchronizer that interfaces with said workflow manager/event scheduler and said ground based common data store system for determining when to transmit wireless messages including said data to said mobile platform; and
   said data synchronizer further adapted to monitor return wireless transmissions from said mobile platform and to determine when to report to a remote, ground based operator of said mobile platform that said message was not received by said mobile platform.

10. The system of claim 9, wherein said data repository comprises a backoffice data repository.

11. The system of claim 9, where said scheduler application comprises a backoffice scheduler application.

12. The system of claim 9, wherein:
   said data application comprises a backoffice data repository;
   said scheduler application comprises a backoffice scheduler application; and
   said backoffice interface manager adapted to coordinate communications between said workflow manager/event scheduler and both of said backoffice data repository and said backoffice scheduler.

13. The system of claim 12, wherein said computer controlled support system includes:

a data aggregator in communication with said backoffice interface manager for coordinating the storage of data and scheduling information from said backoffice data repository and said backoffice scheduler.

14. The system of claim 9, further comprising an event/service bus for interfacing said workflow manager/event scheduler with said data synchronizer.

15. The system of claim 9, wherein said mobile platform includes an electronic communications management function "eCMF" application that communicates with the computer controlled support system and sends a message to said computer controlled support system to verify receipt of a message therefrom.

16. A method for automatically synchronizing and communicating data between a mobile platform and a remote system, where the remote system has a backoffice data repository and a backoffice scheduler application both controlled by an entity operating said mobile platform, the method comprising:
  using backoffice interface manager to interface with said data repository and said scheduler application;
  further using the backoffice interface manager to convert a plurality of differing formats of the data from the backoffice data repository and the scheduling information from the backoffice scheduler into a common format; and
  using a computer controlled support system located remote from said mobile platform and in communication with said interface manager, and having a common data store "CDS" subsystem, to hold data and to synchronize the communication of said data between at least one mobile subsystem carried on said mobile platform and said data repository to facilitate communication between said at least one mobile subsystem and said scheduler application, and to ensure communication of said data between said mobile subsystem and said remote system within a predetermined operational event pertaining to said mobile platform.

17. The method of claim 16, wherein using said computer controlled support system comprises using a computer controlled ground support system that includes an electronic communications management function "eCMF" for coordinating and transmitting multi-network communications between said mobile subsystem of said mobile platform and said remote system being operated by said entity.

18. The method of claim 16, wherein using said computer controlled support system comprises using a data synchronizer responsive to said CDS subsystem for assisting in synchronizing and transmitting said data received from said CDS subsystem to said mobile subsystem of said mobile platform.

19. The method of claim 18, wherein using said computer controlled support system comprises using a workflow manager/event scheduler to control when scheduling information is to be transmitted to said data synchronizer.

20. The method of claim 16, wherein using a computer controlled support system comprises using a data aggregator to control the storage of said data in an aggregated data store, and the storage of scheduling information in a workflow data store.

\* \* \* \* \*